(12) United States Patent
Secretin et al.

(10) Patent No.: US 12,181,139 B2
(45) Date of Patent: Dec. 31, 2024

(54) MODULAR CONNECTION MODULE FOR A LUMINAIRE THAT REDUCES THE REQUIRED NUMBER OF WIRE HARNESSES AND CONSERVES SPACE

(71) Applicant: Schreder S.A., Brussels (BE)

(72) Inventors: Laurent Secretin, Remicourt (BE); Laurent Etorre, Schaerbeek (BE)

(73) Assignee: Schreder S.A., Brussels (BE)

( * ) Notice: Subject to any disclaimer, the term of this patent is extended or adjusted under 35 U.S.C. 154(b) by 598 days.

(21) Appl. No.: 17/424,256

(22) PCT Filed: Jan. 22, 2020

(86) PCT No.: PCT/EP2020/051533
§ 371 (c)(1),
(2) Date: Jul. 20, 2021

(87) PCT Pub. No.: WO2020/152227
PCT Pub. Date: Jul. 30, 2020

(65) Prior Publication Data
US 2022/0113014 A1 Apr. 14, 2022

(30) Foreign Application Priority Data
Jan. 22, 2019 (NL) ...................................... 2022430

(51) Int. Cl.
*F21V 23/06* (2006.01)
*F21V 25/10* (2006.01)
(Continued)

(52) U.S. Cl.
CPC .............. *F21V 23/06* (2013.01); *F21V 25/10* (2013.01); *H02H 9/041* (2013.01); *H05B 45/50* (2020.01); *F21Y 2115/10* (2016.08)

(58) Field of Classification Search
CPC ........ F21K 9/278; F21V 23/004; F21V 23/06; F21V 25/10; F21V 29/507;
(Continued)

(56) References Cited

U.S. PATENT DOCUMENTS 9,000,672 B2 * 4/2015 Mercier .................. H05B 47/24
315/125
9,462,655 B1 10/2016 Davis
(Continued)

FOREIGN PATENT DOCUMENTS

CN 106026065 B 7/2018
EP 2732525 A1 5/2014
(Continued)

OTHER PUBLICATIONS

PCT International Search Report and Written Opinion, Application No. PCT/EP2020/051533, mailed Feb. 19, 2020, 10 pages.

*Primary Examiner* — Jared Fureman
*Assistant Examiner* — Nicolas Bellido
(74) *Attorney, Agent, or Firm* — McDonnell Boehnen Hulbert & Berghoff LLP

(57) ABSTRACT

Example embodiments relate to connection modules for luminaires. One example connection module for a luminaire with a light module includes a support. The connection module also includes a surge protection circuitry arranged on the support. Additionally, the connection module includes a first and second supply terminal for connection to a power supply. The first and second supply terminal are connected to the surge protection circuitry. Further, the connection module includes a first and second load terminal for connection to a drive means of the light module. The first and second load terminal are connected to the surge protection circuitry. In addition, the connection module includes at least a first and second control terminal. A connection line (Continued)

for electrically connecting the first and second control terminals is arranged on the support.

18 Claims, 7 Drawing Sheets

(51) Int. Cl.
  *F21Y 115/10*  (2016.01)
  *H02H 9/04*  (2006.01)
  *H05B 45/50*  (2022.01)
(58) Field of Classification Search
  CPC ...... F21Y 2115/10; H01H 83/10; H02H 9/04; H02H 9/041; H02H 9/042; H02H 9/043; H02H 9/044; H02H 9/06; H05B 41/292; H05B 41/298; H05B 45/50; H05B 47/10; H05B 47/20; H05B 47/24; H05B 47/25; H05B 47/26; Y02B 20/30
  See application file for complete search history.

(56) References Cited

U.S. PATENT DOCUMENTS

| | | | | |
|---|---|---|---|---|
| 9,997,909 | B2 * | 6/2018 | Sesink | H02H 9/06 |
| 2010/0127625 | A1 * | 5/2010 | Minarczyk | H05B 41/292 |
| | | | | 315/119 |
| 2014/0042908 | A1 | 2/2014 | Mercier | |
| 2014/0168833 | A1 * | 6/2014 | Sesink | H02H 9/06 |
| | | | | 361/56 |
| 2016/0081147 | A1 * | 3/2016 | Guang | H05B 45/345 |
| | | | | 315/123 |
| 2018/0269678 | A1 * | 9/2018 | Bandel | H02H 7/20 |
| 2018/0302971 | A1 * | 10/2018 | Clauberg | H02M 1/4208 |

FOREIGN PATENT DOCUMENTS

| | | | | |
|---|---|---|---|---|
| NL | 2024888 B1 * | 2/2020 | | |
| WO | WO-2013097590 A1 * | 7/2013 | | H02H 3/20 |
| WO | WO-2020144273 A1 * | 7/2020 | | H05B 45/50 |

* cited by examiner

MODULAR CONNECTION MODULE FOR A LUMINAIRE THAT REDUCES THE REQUIRED NUMBER OF WIRE HARNESSES AND CONSERVES SPACE

CROSS-REFERENCE TO RELATED APPLICATIONS

The present application is a national stage entry of PCT/EP2020/051533 filed Jan. 22, 2020, which claims priority to NL 2022430 filed Jan. 22, 2019, the contents of each of which are hereby incorporated by reference.

FIELD OF INVENTION

The present invention relates to a connection module for a luminaire with a light module, and to a luminaire comprising such a connection module.

BACKGROUND

Luminaires, in particular outdoor luminaires, comprise a luminaire housing in which a support with at least one light source is arranged. Typically, the at least one light source comprises a plurality of light-emitting diodes (LEDs). For example, a luminaire may comprise a luminaire pole and a luminaire head formed by the luminaire housing. In other luminaires, the luminaire head may be connected to a wall. A drive means for the at least one light source, typically in the form of a LED driver, may be arranged in or on the luminaire head, in or on the luminaire pole, or in any other suitable location of the luminaire. In order to leverage the benefit of long life of the at least one light source, typically a plurality of LEDs, the luminaire is typically designed to be robust under lighting surge events. Surge protection devices (SPDs) are provided to absorb energy and protect the drive means, typically including a LED driver circuit. Further, outdoor luminaires typically use control modules containing different control blocks and/or sensors, e.g. a light sensor for sensing the light level of ambient light to automatically control the light sources. Depending on the amount of components to be electrically connected inside a luminaire housing, such as SPDs, control modules, LED drivers, power supply wires, fuses, varistors, and the like, a large number of wire harnesses to be created and maintained may be required, which may be long and cumbersome on the assembly lines at the manufacturing stage or during maintenance, and may increase the risk of causing wiring mistakes between the different components inside a luminaire housing.

SUMMARY

The object of embodiments of the invention is to provide a connection module for a luminaire with a light module which can be modular, reduce the number of wire harnesses to be developed, reduce the number of connections to be performed on the assembly lines, and save space, and also to provide a luminaire comprising such a connection module.

According to a first aspect of the invention, there is provided a connection module for a luminaire with a light module, comprising a support, surge protection circuitry arranged on the support, a first and second supply terminal for connection to a power supply, said first and second supply terminals being connected to the surge protection circuitry, a first and second load terminal for connection to a drive means of the light module, said first and second load terminals being connected to the surge protection circuitry, and at least a first and second control terminal. A connection line for electrically connecting the first and second control terminals is arranged on the support.

By providing a connection module comprising a support, surge protection circuitry arranged on the support, a first and second supply terminal for connection to a power supply, a first and second load terminal for connection to a drive means of the light module, and at least a first and second control terminal, the connections between the different components can be made more easily. By connecting the first and second supply terminals to the surge protection circuitry, and the first and second load terminals to the surge protection circuitry, a more compact wiring arrangement is obtained, thereby saving space inside the luminaire, more in particular inside a housing of the luminaire. Moreover, by providing a connection line arranged on the support for electrically connecting the first and second control terminal, the number of wire harnesses to be developed is reduced, as well as the number of connections to be performed on the assembly lines. Furthermore, by providing a connection module as defined above, the modularity and the flexibility of the luminaire is enhanced, as other components may be further electrically connected to the connection module. In addition, such a connection modules enables a certification of the whole electrical assembly at once, thereby saving time and money in the certification procedures.

Preferred embodiments relate to an outdoor luminaire By outdoor luminaire, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

Preferably, the first and second supply terminals, the first and second load terminals, and the first and second control terminals are arranged on the support.

According to a preferred embodiment, the support comprises a printed circuit board, preferably a multilayer PCB.

According to a preferred embodiment, the surge protection circuitry comprises at least one metal oxide varistor (MOV) and at least one thermal protection device such as a thermal fuse. According to an exemplary embodiment, a MOV and a thermal fuse are connected in series between the first supply terminal and the second supply terminal. Alternatively, the MOV and the thermal fuse may be integrated into a single component.

Indeed, the surge protection circuitry is provided to absorb energy and protect the drive means. The MOV clamps the voltage between the first and second supply terminals to a predetermined maximum voltage that is selected to be within the limits required by the drive means. The thermal fuse will open when the temperature caused by an excess current exceeds a predetermined threshold. In that way, the MOV is protected from high currents. The threshold may be selected to open the thermal fuse before the heat generated is so high as to cause failure of the MOV that could damage other components of the drive means.

According to a preferred embodiment, the connection module further comprises an equipotential terminal for connection to an equipotential part of the luminaire.

Indeed, if a housing of the luminaire is partially/totally made of non-conductive material, electrostatic charge may accumulate due to absence of a direct electrical path between the luminaire housing and the earth. The luminaire housing may then be connected to an earth, and the connection module may be provided with an equipotential terminal for connection to the equipotential part of the luminaire.

According to a preferred embodiment, the connection module further comprises electrostatic discharge (ESD) protection circuitry arranged on the support and connected between the equipotential terminal and the second supply terminal. According to an exemplary embodiment, the ESD protection circuitry comprises resistive circuitry. Alternatively, the ESD protection circuitry may comprise a spark gap element.

In this way, the equipotential terminal of the connection module may be connected to the equipotential part of the luminaire, such that a resistive electrical path is created between the equipotential part of the luminaire and the second supply terminal through the resistive circuitry. The resistive circuitry present between the equipotential terminal and the second supply terminal allows a small current (an intentional leakage current) to flow from the equipotential part of the luminaire to the neutral line of the electrical distribution grid. Thus, when electrostatic charges accumulate on the equipotential part of the luminaire, those charges can leak towards the earth through the neutral line thanks to the resistive circuitry. Hence, the risk of accumulating electrostatic charge to a critical level so that an ESD can happen through an insulation layer and damage semiconductor components such as LEDs, is reduced.

According to a preferred embodiment, the resistive circuitry has an equivalent resistance value which is between 1 Mega Ohm and 100 Mega Ohm, preferably between 1.5 Mega Ohm and 10 Mega Ohm, within a frequency range of 0 Hz to 100 kHz, preferably 0 Hz to 1 GHz.

Resistance values in the above-mentioned range are suitable for ensuring that the amount of electrostatic charges on the equipotential part of the luminaire cannot increase too rapidly. Typically, the equivalent resistance value has to be low enough to prevent electrostatic charge accumulation above a critical level, while being high enough to prevent electrical safety concerns related to the bridging of an insulation barrier between the electrical distribution grid and the accessible equipotential part of the luminaire According to frequency values in the above-mentioned range, the resistive circuitry may provide a high electrical resistivity over a frequency range from direct current to high frequency alternative current or transient.

According to an exemplary embodiment, the resistive circuitry comprises at least one resistor. According to a preferred embodiment, the resistive circuitry comprises at least two resistors connected in series in a branch between the equipotential terminal and the second supply terminal.

Resistors have the advantage of being robust, cheap, and easy to integrate into the luminaire driver. In that manner, in case one resistor is failing in short circuit, the second one can still protect against an electric shock.

According to a preferred embodiment, the connection module further comprises a fuse arranged on the support and connected between the first supply terminal and the surge protection circuitry.

The fuse between the first supply terminal and the surge protection circuitry is a supplementary protection for the connection module, and may protect the drive means from high currents in case of failure of the surge protection circuitry.

According to a preferred embodiment, the connection module further comprises a supply connector comprising the first and second supply terminal, said supply connector being configured for receiving at least two wire ends.

The supply connector comprising the first and second supply terminals enables establishing a connection of the connection module to the live (L) and neutral (N) wires of a power supply such as an electrical power distribution grid.

According to a preferred embodiment, the connection module further comprises a load connector provided with at least two load connection pins for cooperating with a socket plug, said at least two load connection pins comprising the first and second load terminal.

The load connector comprising the first and second load terminals enables establishing a connection of the connection module to a socket plug included in the drive means.

According to a preferred embodiment, the connection module further comprises at least one low voltage connector provided with at least two low voltage connection pins.

The at least low voltage connector enables establishing a connection of the connection module to a low voltage control means. The connection module may communicate with the low voltage control means using one or more communication protocols. The at least one low voltage connector may then be used to receive and/or send at least one input and/or output signal using said one or more communication protocols.

According to a preferred embodiment, the connection module further comprises a socket connector provided with at least two socket connection pins.

The socket connector enables establishing a connection of the connection module to a socket means. The connection module may communicate with the socket means using one or more communication protocols. The socket connector may then be used to receive and/or send at least one input and/or output signal using said one or more communication protocols.

According to an exemplary embodiment, the supply connector further comprises the first control terminal. According to an exemplary embodiment, said at least two load connection pins further comprise the second control terminal. More generally, said load connector may further comprise the second control terminal.

In this way, a direct connection line for electrically connecting the first and second control terminals may be arranged on the support, between the supply connector and the load connector.

Power control of the drive means may be realized by e.g. bipower control which is a type of power modulation.

According to a preferred embodiment, the supply connector further comprises the equipotential terminal. According to a preferred embodiment, said at least two load connection pins further comprise a further equipotential terminal, and a connection line for electrically connecting the equipotential terminal with the further equipotential terminal is arranged on the support. More generally, said load connector may further comprise the further equipotential terminal.

According to an exemplary embodiment, said at least two low voltage connection pins comprise the first control terminal or the second control terminal. More generally, said low voltage connector may comprise the first control terminal or the second control terminal.

In this way, a connection line for electrically connecting the first and second control terminals may be arranged on the support, between the supply connector and the low voltage connector, or between the low voltage connector and the load connector. Low voltage control of the drive means may be realized by e.g. dimming control using e.g. a DALI communication protocol.

According to another exemplary embodiment, said at least two low voltage connection pins comprise a third control terminal, and a connection line for electrically connecting the first control terminal and/or the second control terminal with the third control terminal is arranged on the support.

In this way, a connection line for electrically connecting the first and third control terminal may be arranged on the support, between the supply connector and the low voltage connector, and/or a connection line for electrically connecting the third and second control terminal may be arranged on the support, between the low voltage connector and the load connector, whilst a connection line for electrically connecting the first and second control terminals may be arranged on the support, between the supply connector and the load connector.

According to a preferred embodiment, the supply connector further comprises a fourth control terminal, said at least two low voltage connection pins further comprise a fifth control terminal, and a connection line for electrically connecting the fourth control terminal with the fifth control terminal is arranged on the support.

This arrangement enables a further connection between the low voltage connector and the supply connector, by providing a further connection line connecting the fourth control terminal with the fifth control terminal on the support.

According to an exemplary embodiment, said at least two socket connection pins comprise the first control terminal or the second control terminal. More generally, said socket connector may comprise the first control terminal or the second control terminal.

In this way, a connection line for electrically connecting the first and second control terminals may be arranged on the support, between the supply connector and the socket connector, or between the socket connector and the load connector. Power control of the drive means may be realized by e.g. dimming control using e.g. a DALI communication protocol.

According to another exemplary embodiment, said at least two socket connection pins comprise a third control terminal, and a connection line for electrically connecting the first control terminal and/or the second control terminal with the third control terminal is arranged on the support.

In this way, a connection line for electrically connecting the first and third control terminals may be arranged on the support, between the supply connector and the socket connector, and/or a connection line for electrically connecting the third and second control terminals may be arranged on the support, between the socket connector and the load connector, whilst a connection line for electrically connecting the first and second control terminals may be arranged on the support, between the supply connector and the load connector.

According to a preferred embodiment, the supply connector further comprises a fourth control terminal, said at least two socket connection pins further comprise a fifth control terminal, and a connection line for electrically connecting the fourth control terminal with the fifth control terminal is arranged on the support.

This arrangement enables a further connection between the socket connector and the supply connector, by providing a further connection line connecting the fourth control terminal with the fifth control terminal on the support.

According to an exemplary embodiment, said at least two low voltage connection pins or said at least two socket connection pins further comprise a sixth control terminal, said at least two socket connection pins or said at least two low voltage connection pins further comprise a seventh control terminal, respectively, and a connection line for electrically connecting the sixth control terminal with the seventh control terminal is arranged on the support.

This arrangement enables a further direct connection between the low voltage connector and the socket connector, by providing yet a further connection line connecting the sixth control terminal with the seventh control terminal on the support. Communication between the low voltage connector and the socket connector may comprise dimming control inputs and/or outputs using e.g. a DALI communication protocol.

According to a preferred embodiment, the connection module further comprises an indicator device and monitoring circuitry configured to monitor a malfunctioning of the surge protection circuitry and to provide an output signal to the indicator device based on said monitoring.

Adding an indicator device, preferably an optical indicator device, such as a LED can be done in various ways. Preferably, the indicator device is arranged on or in the luminaire housing. For example, the indicator device may be arranged on the support of the connection module. Preferably, the monitoring circuitry is arranged on the support of the connection module.

According to an exemplary embodiment, the monitoring circuitry is connected to the surge protection circuitry such that a state of the indicator device is changed when the output signal indicates the malfunctioning of the surge protection circuitry.

By adding an indicator device such as a LED such that the state of the indicator device is changed when the output signal indicates the malfunctioning of the surge protection circuitry, an operator can easily detect said malfunctioning and repair or replace the surge protection circuitry.

According to an exemplary embodiment, the indicator device is arranged at a location which is such that the state of the indicator device is visible from outside of the luminaire.

By adding an indicator device such as a LED such that the state of the indicator device is visible from outside of the luminaire, an operator can easily detect a malfunctioning without having to open the luminaire housing. For example, in case of a typical outdoor luminaire, the malfunctioning may be visible for an operator from a location at ground level.

In an exemplary embodiment, the indicator device comprises an indicator light element and a light guide arranged for guiding light of the indicator light element to a location which is such that the state of the indicator device is visible from outside of the luminaire housing. The indicator light element may be a LED which is part of the connection module containing the surge protection circuitry. The light guide can guide the light to a suitable location which can be easily checked by an operator at ground level. For example, the housing of the luminaire may comprise a transparent or translucent cover and the light guide may extend from the indicator light element to a location which is visible through the transparent or translucent cover, such that light passing through the light guide is emitted out of the luminaire housing through the transparent or translucent cover. According to another example, the light guide extends from the indicator light element to a location in or near the pole which is accessible by an operator at ground level. The transparent or translucent cover may be the same cover as the one though which the light module of the luminaire emits light or may be a separate transparent or translucent cover or plug arranged in the luminaire housing. In an exemplary embodiment, the indicator light element may be provided on the support of the connection module, and optionally extend through a hole of a housing of the connection module, but it could also be provided at another location inside or outside of the connection module, e.g. on a housing of the connection module.

In an exemplary embodiment, the luminaire housing is provided with a socket, wherein the indicator device is arranged in the socket, and the monitoring circuitry is connected in such a way to the socket that a state of said indicator device is changed when the output signal indicates a malfunctioning. For example, the indicator device may be included in a watertight external module in which an indicator LED is mounted, and which is adapted to be inserted in the socket. This external module may contain also other functionalities. For example, the external module may be adapted to signal other messages in addition to the malfunctioning of the surge protection circuitry and/or to sense data such as environmental data (for example, the external module may comprise a movement sensor, a light sensor, an image sensor, a radar sensor, etc.) and/or to communicate with other devices. Such external module may be for example a NEMA or Zhaga module as described in more detail below.

The surge protection circuitry and monitoring circuitry may be configured to provide the output signal automatically or on request, e.g. on request of maintenance personnel. In other words, a push mechanism and/or a pull mechanism may be used to signal the malfunctioning. For example, upon request, the indicator device may emit a green light if the surge protection circuitry is OK or a red light if the surge protection circuitry is broken.

According to an exemplary embodiment, the monitoring circuitry is configured to monitor a malfunctioning of the surge protection circuitry and to provide an output signal based on said monitoring, when the at least one light source is off. In that manner, it is possible to check the functioning of the surge protection circuitry of a luminaire during daytime e.g. during working hours, when the at least one light source is off. For certain embodiments, where the indicator device is included in or near the luminaire head, this further has the advantage that it is easier to look at the luminaire head from the ground when the light is off.

In an alternative embodiment, the indicator device is located on a light module of the luminaire, e.g. on a support such as a PCB carrying also at least one light source of the luminaire.

By including the indicator device on the light module, a simple and robust solution is provided with a limited cost. More in particular, adding an indicator device such as a LED to the light module can be easily achieved and does not entail other modifications to the luminaire. For example, it is not required to provide an additional opening or transparent cover in the housing to make the indicator device visible. Also, by adding an indicator device such as a LED to the light module, when the light module is included for example in a typical outdoor luminaire, it will be easily visible from the ground, and the housing with a transparent or translucent cover provided for the light module will also serve as a protection for the indicator device.

Preferably, the monitoring circuitry is connected such that the output signal is provided to at least one of:

the indicator device such that a state of said indicator device is changed when the output signal indicates a malfunctioning, drive and/or control circuitry of the drive means configured for driving the indicator device based on the output signal, such that a state of said indicator device is changed when the output signal indicates a malfunctioning, a control means configured for controlling the drive means based on said output signal, wherein the drive means is configured to drive the indicator device such that a state of said indicator device is changed when the output signal indicates a malfunctioning.

In other words the output signal may be provided directly to the indicator device or via drive or control means. When the output signal is provided directly to the indicator device, the monitoring circuit may be configured to provide, as an output signal, a current or voltage having a level which is suitable to power the indicator device when a malfunction is detected, whilst the level is not adapted to power the indicator device when the surge protection circuitry operates normally, or vice versa. In another embodiment, the drive means comprise drive and/or control circuitry configured to drive the indicator device, and the output signal is provided to the drive means, so that the drive means can drive the indicator device based on the received output signal. As the drive means also have to drive the at least one light source, such a solution may be advantageous in terms of required connections. In yet another embodiment, the luminaire comprises a control means configured for controlling the drive means, and the output signal is provided to the control means. Such control means may then also control the drive means in order to control the powering of the indicator device such that the indicator device indicates a malfunctioning when the output signal indicates a malfunctioning.

According to an exemplary embodiment, the indicator device comprises at least one LED. The at least one LED may comprise at least one LED configured to emit an indicator light different from the light emitted by the at least one light source of the light module. For example the indicator may be a dedicated, specific light, e.g. a light with a particular color, such as a red color, a light with a determined wavelength, a light with a flashing pattern, etc. A red light is advantageous in the sense that red is a generally accepted color to indicate a malfunctioning, and in that it can be easily distinguished from the color of the at least one light source which is usually a warm or cold white. However, the at least one indicator LED may also be configured to emit another color, e.g. green or blue. Alternatively or additionally, the indicator device could be configured to emit light with a flashing pattern. Also, the indicator device could be another visible light source (e.g. laser, UV, IR, a flash light, etc.). In yet another embodiment, a transparent or translucent cover is arranged over the at least one light source and the at least one indicator light, and a small portion of the transparent or translucent cover is provided in a color, such that this colored portion lights up when the at least one indicator light is activated.

In an alternative embodiment, the luminaire further comprise a transmission means and the monitoring circuitry is connected such that the output signal can be provided to the transmission means and the transmission means is configured for transmitting a malfunction message to a remote device based on the output signal.

According to an exemplary embodiment, the malfunction message may be automatically sent, e.g. when the output signal indicates a malfunctioning. Alternatively or in addition, the transmission means may be configured to receive a request for information about the functioning of the surge protection circuitry from a remote device, and to send in response a malfunction message comprising an indication whether or not there is a malfunctioning of the surge protection circuitry based on the output signal to the remote device. In other words, a push mechanism and/or a pull mechanism may be used to transmit the malfunction message to a remote device.

In an alternative embodiment, the luminaire further comprises a display and the monitoring circuitry is connected such that a message is indicated on the display based on the output signal. Preferably, the display comprises a display screen configured to display text and/or images to an operator. For example, a message could be automatically displayed at specific moments in time (e.g. when the luminaire is switched on) with an indication on whether the surge protection circuitry is still working or not.

Such an embodiment will in particular be advantageous when a display is present in the luminaire for other purposes. For example, a display could be present to provide passersby with information, such as environmental information, advertisements, information about the area, etc. Such a display may be provided to any component of the luminaire. For example, the display may be integrated in, positioned in, or provided to a luminaire pole of the luminaire, a component such as a cabinet, attached to the luminaire pole or located adjacent the luminaire pole, a luminaire head, a luminaire module, etc.

Alternatively or in addition to the monitoring circuitry and the indicator device such as a LED, a determining means may be present in or on the luminaire housing, preferably in the connection module, more preferably on the support.

According to an exemplary embodiment, said determining means may be able to communicate with the surge protection circuitry or to directly measure relevant information with respect to the surge protection circuitry, and to redirect and send said relevant information to a device that is remote from the connection module. The determining means may be linked to a remote server to provide any useful information such as malfunction, energy consumption, working time, etc., of the surge protection circuitry.

According to another exemplary embodiment, said determining means may be able to communicate with any device in the luminaire which is connected to the connection module other than the surge protection circuitry, such as the drive means, or sensing means, or control means, etc., or to directly measure relevant information with respect to said other devices, and to redirect and send said relevant information to a device that is remote from the connection module. The determining means may be linked to a remote server to provide any useful information such as malfunction, energy consumption, working time, etc., of said other devices.

For example, in case of failure of the surge protection circuitry, the determining means may perform diagnostics or analysis on the surge protection circuitry, and may be able to detect said failure and to communicate it to said remote device in order to warn an operator that replacement or maintenance needs to be performed on the surge protection circuitry. Said remote device may be located inside the luminaire and may correspond to a central communication means of the luminaire with the outside, or may be located outside the luminaire, possibly in a remote place, and may be e.g. a remote server, a smartphone, tablet, or laptop of a user or an operator. In this latter case, the determining means and the remote device may form together a tele management system for indicating a failure of the surge protection circuitry. Such a tele management system may be also used e.g. to predict a maintenance or replacement of the surge protection circuitry based on a measure of its power consumption and based on its lifetime.

According to an exemplary embodiment, the determining means may be a monitoring or metering means.

According to an exemplary embodiment, the determining means may be configured to determine how many times the surge protection circuitry has been activated and/or when the surge protection circuitry was activated, based on data obtained by a detection means. The detection means may be provided in or on the luminaire housing, preferably in the connection module, more preferably on the support of the connection module. The detection means may be configured to detect an activation of the surge protection circuitry. This allows obtaining information related to the activation of the surge protection circuitry. In that manner preventive maintenance can be done, and/or diagnostic information can be obtained, and/or a data analysis may be done.

Optionally, the indicator device may be configured to indicate information related to the activation of the surge protection circuitry, e.g. when the surge protection circuitry was activated and/or how many times the surge protection circuitry was activated.

Preferably, the detection means comprises a light sensor. More preferably, the surge protection circuitry comprises a gas discharge tube (GDT) and the light sensor is configured and arranged to detect light emitted by the surge protection circuitry upon activation thereof. When the GDT is activated, it produces light (typically a spark in a semi-transparent tube) which can be detected by the light sensor. The light sensor may be e.g. a photodiode.

According to another exemplary embodiment, the determining means may be configured to determine how many times any device in the luminaire which is connected to the connection module other than the surge protection circuitry, such as the drive means, or sensing means, or control means, etc., has been activated and/or when said other device was activated, based on data obtained by a detection means. The detection means may be provided in or on the luminaire housing, preferably in the connection module, more preferably on the support of the connection module. The detection means may be configured to detect an activation of said other device. This allows obtaining information related to the activation of said other device. In that manner preventive maintenance can be done, and/or diagnostic information can be obtained, and/or a data analysis may be done.

According to a preferred embodiment, the connection module further comprises a housing. The housing comprises an upper housing part and a lower housing part. The upper and lower housing parts enable to enclose and protect the support, the surge protection circuitry, and the different connection lines of the connection module. Preferably, the upper housing part is provided with one or more holes for receiving and surrounding one or more connectors of the connection module.

Hence, any user or operator of the luminaire containing the connection module has an easy access to the different connectors of the connection module. Moreover, the upper and lower housing parts may be fitted in a detachable way in order to enable the opening of the housing and to perform maintenance of the components of the connection module. In an alternative embodiment, the upper and lower housing parts may be fitted in a permanent way by using e.g. snap-fit hooks or the like.

According to a second aspect of the invention, there is provided a luminaire comprising a connection module according to any one of the previous embodiments, a power supply electrically connected to the first and second supply terminals of the connection module, a drive means electrically connected to the first and second load terminals of the connection module, and a light module electrically connected to the drive means.

According to a preferred embodiment, the luminaire comprises a connection module comprising at least one low voltage connector provided with at least two low voltage connection pins, and further comprises a low voltage control means electrically connected to the at least one low voltage connector of the connection module.

According to a preferred embodiment, the luminaire comprises a connection module comprising a socket connector provided with at least two socket connection pins, and further comprises a socket means electrically connected to the socket connector of the connection module.

According to a preferred embodiment, the luminaire comprises a connection module comprising an equipotential terminal, and further comprises an equipotential part connected to the equipotential terminal of the connection module.

According to a preferred embodiment, the luminaire further comprises a luminaire housing which is at least partially made of an electrically conductive material, wherein the equipotential part of the luminaire is connected to or in contact with the electrically conductive material of the luminaire housing.

According to a preferred embodiment, the luminaire further comprises a heat sink, wherein the equipotential part of the luminaire is connected to or in contact with the heat sink.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF THE FIGURES

The connection module 1 of FIGS. 1A-5B may be included in a luminaire comprising a luminaire head and a luminaire pole. The luminaire head may be connected to the luminaire pole in any manner known to the skilled person. Typical examples of such systems are street lights or sport lights. In other embodiments, the luminaire head may be connected to a wall or a surface, e.g. for illuminating buildings, tunnels or stadiums.

Figure 1A:
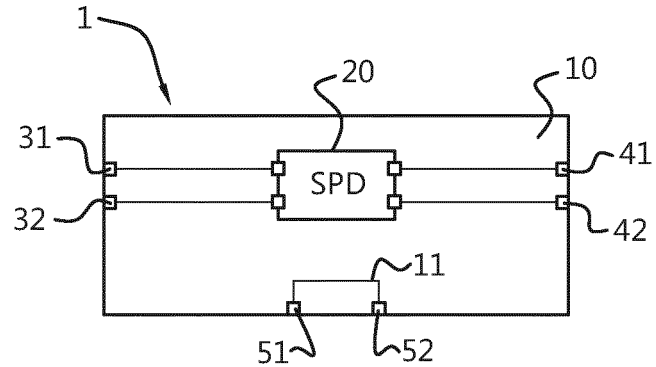
FIGS. 1A and 1B schematically illustrate two exemplary embodiments of a connection module.
Figure 1B:
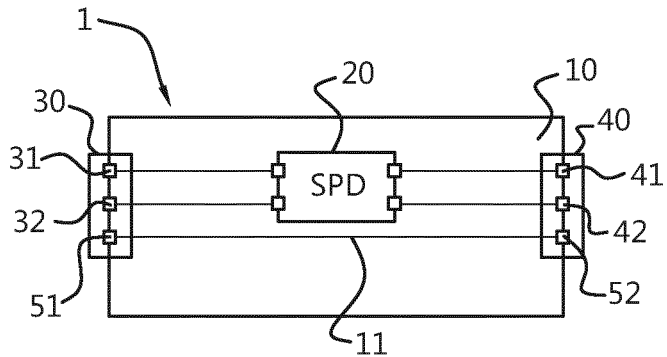

FIGS. 1A and 1B schematically illustrate two exemplary embodiments of a connection module.

As illustrated in FIGS. 1A and 1B, a connection module 1 for a luminaire with a light module (not shown, see FIGS. 6A-6D), comprises a support 10, surge protection circuitry 20 arranged on the support 10, a first and second supply terminal 31, 32 for connection to a power supply (not shown), a first and second load terminal 41, 42 for connection to a drive means (not shown) of the light module, and at least a first and second control terminal 51, 52. The first and second supply terminals 31, 32 are connected to the surge protection circuitry 20. The first and second load terminals 41, 42 are connected to the surge protection circuitry 20. A connection line 11 for electrically connecting the first and second control terminals 51, 52 is arranged on the support 10. The support 10 comprises a printed circuit board (PCB), preferably a multilayer PCB. The multilayer PCB preferably comprises at least two connection layers, more preferably at least four connections layers. Preferably, the first and second supply terminals 31, 32, the first and second load terminals 41, 42, and the first and second control terminals 51, 52 are arranged on the support 10. Connections lines such as the above-mentioned connection line 11 are realized on the different layers of the multilayer PCB in any manner known by a skilled person.

As illustrated in FIG. 1B, the connection module 1 comprises a supply connector 30 comprising the first and second supply terminals 31, 32. The supply connector 30 is configured for receiving at least two wire ends (not shown, see FIGS. 3A-5B). In an alternative embodiment, the supply connector may comprise at least two supply connection pins configured for cooperating with a socket plug connected to at least two power supply wire ends. The supply connector 30 further comprises the first control terminal 51. The connection module 1 comprises a load connector 40 provided with at least two load connection pins for cooperating with a socket plug (not shown). In an alternative embodiment, the load connector may be configured for receiving at least two load wire ends. The at least two load connection pins comprise the first and second load terminals 41, 42. The at least two load connection pins further comprise the second control terminal 52. As in FIG. 1A, a connection line 11 for electrically connecting the first and second control terminals 51, 52 is arranged on the support 10. Hence, a direct connection line for electrically connecting the first and second control terminals 51, 52 is arranged on the support 10, between the supply connector 30 and the load connector 40. Control of the drive means may be realized by e.g. bipower control, wherein either a full power from the power supply may be transferred to the drive means, or only half of said power may be transferred to the drive means. This may be realized by the provision of a varistor (not shown, see element 19 in FIG. 7) arranged between the first control terminal 51 and the second supply terminal 32.

Figure 2A:
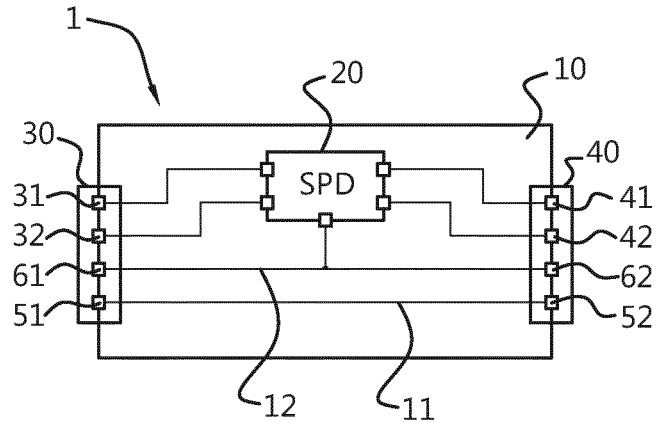
FIGS. 2A-2C schematically illustrate three other exemplary embodiments of a connection module.
Figure 2B:
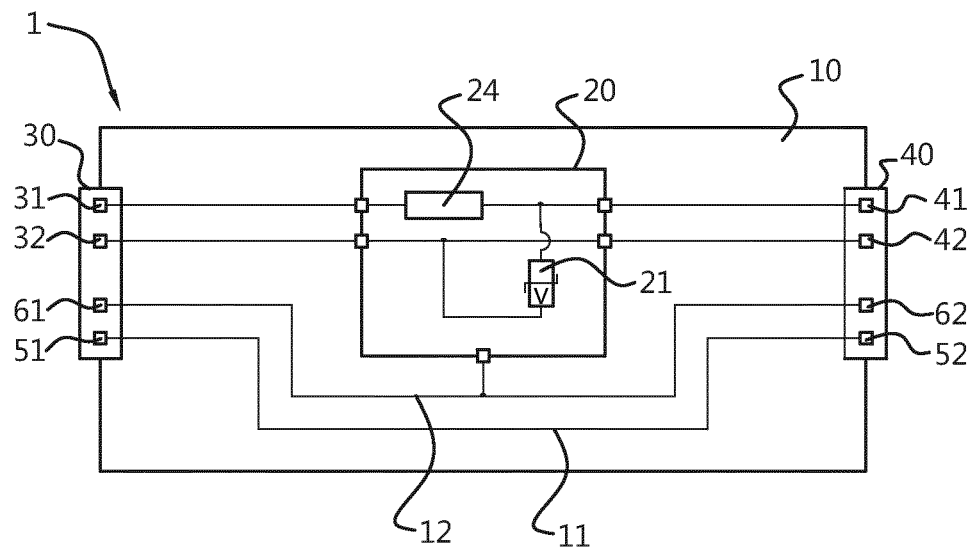
Figure 2C:
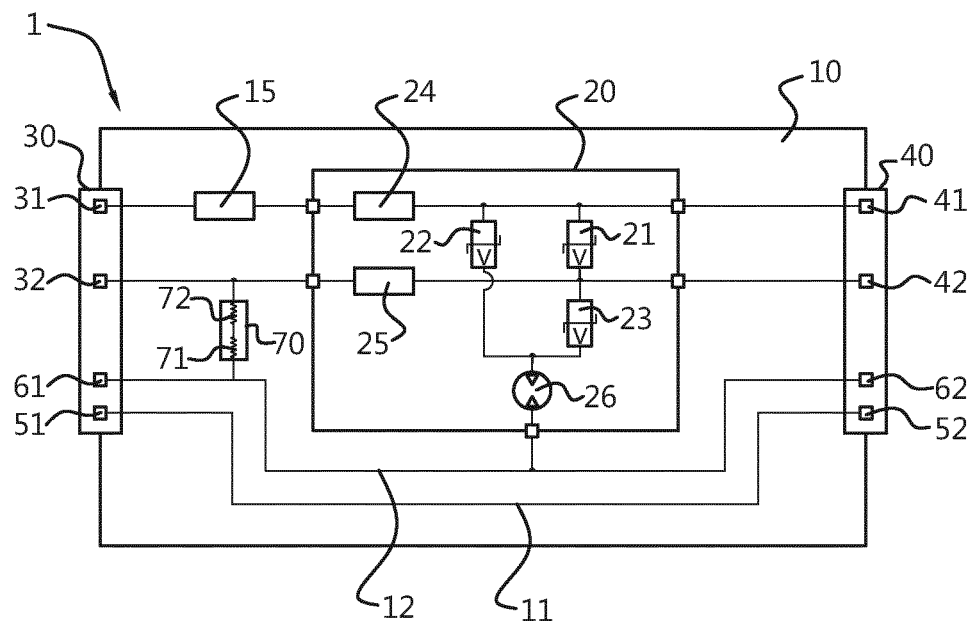

FIGS. 2A-2C schematically illustrate three other exemplary embodiments of a connection module.

As illustrated in FIG. 2A-2C, the connection module 1 comprises an equipotential terminal 61 for connection to an equipotential part of the luminaire (not shown). The supply connector 30 further comprises the equipotential terminal 61. The at least two load connection pins further comprise a further equipotential terminal 62. A connection line 12 for electrically connecting the equipotential terminal 61 with the further equipotential terminal 62 is arranged on the support 10. The surge protection circuitry 20 is connected to the connection line 12 via a connection line arranged on the support 10.

As illustrated in FIGS. 2B and 2C, the surge protection circuitry 20 may comprise at least one metal oxide varistor (MOV) 21 and at least one thermal protection device 24 such as a thermal fuse. The MOV 21 and the thermal fuse 24 are connected in series between the first supply terminal 31 and the second supply terminal 32. In other embodiments, the MOV 21 and the thermal fuse 24 may be included in a single component.

As illustrated in FIG. 2C, the surge protection circuitry 20 comprises three MOVs 21, 22, 23 and two thermal protection devices 24, 25 such as thermal fuses. The MOVs 21, 22, 23 and the thermal fuses 24, 25 are arranged between the first supply terminal 31 and the second supply terminal 32. In a first branch, the MOV 21 is connected between the first supply terminal 31 and the second supply terminal 32. In a second branch in parallel with the first branch, the MOVs 22, 23 are connected in series between the first supply terminal 31 and the second supply terminal 32. The surge protection circuitry 20 may comprise a gas discharge tube (GDT) 26 connected between the second branch comprising the MOVs 22, 23 and the connection line 12. The GDT 26 creates an effective short circuit when triggered, so that if any electrical energy is present on the at least one terminal, the GDT 26 will form a short circuit. Once triggered, the GDT 26 will continue conducting until all electric current sufficiently diminishes, and the gas discharge quenches. Such embodiments have been described in detail in the Dutch patent application N2022357 filed on 9 Jan. 2019 in the name of the applicant, which is included here in its entirety by reference.

The connection module 1 further comprises electrostatic discharge (ESD) protection circuitry 70 arranged on the support 10 and connected between the equipotential terminal 61 and the second supply terminal 32. The ESD protection circuitry 70 may comprise resistive circuitry. In other embodiments, the ESD protection circuitry 70 may further comprise an element such as a spark gap element configured for opening the circuitry, thereby avoiding permanent leakage currents between the second supply terminal 32 and the equipotential terminal 61, and only enabling such leakage currents when electrostatic charges need to be removed from the luminaire. The resistive circuitry may have an equivalent resistance value which is between 1 Mega Ohm and 100 Mega Ohm, preferably between 1.5 Mega Ohm and 10 Mega Ohm, within a frequency range of 0 Hz to 100 kHz, preferably 0 Hz to 1 GHz. The resistive circuitry may comprise at least one resistor 71. The resistive circuitry may comprise at least two resistors 71, 72 connected in series in a branch between the equipotential terminal 61 and the second supply terminal 32. The connection module 1 may further comprise a fuse 15 arranged on the support 10 and connected between the first supply terminal 31 and the surge protection circuitry 20. In other embodiments, the fuse 15 may be arranged outside the connection module 1. Such embodiments have been described in detail in the Dutch patent application N2021706 filed on 25 Sep. 2018 in the name of the applicant, which is included here in its entirety by reference.

Although not shown, the connection module 1 may further comprise electromagnetic compatibility (EMC) filtering and in-rush current limiter arranged between the surge protection circuitry 20 and the load connector 40.

Figure 3A:
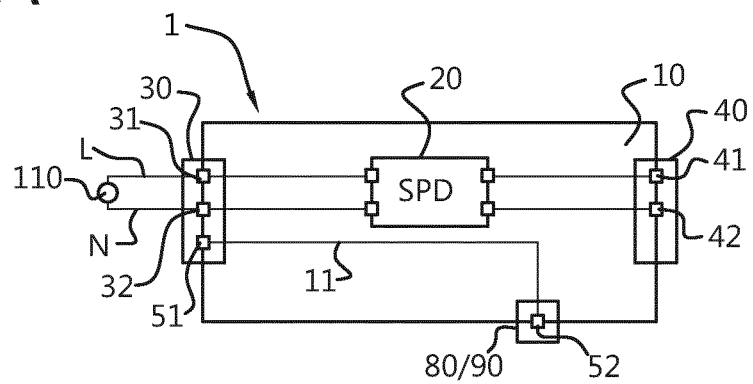
FIGS. 3A and 3B schematically illustrate two other exemplary embodiments of a connection module.
Figure 3B:
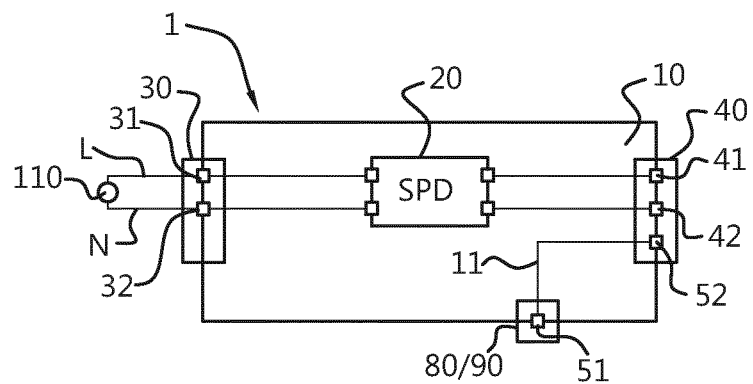

FIGS. 3A and 3B schematically illustrate two other exemplary embodiments of a connection module.

As illustrated in FIGS. 3A and 3B, the connection module 1 comprises a supply connector 30 comprising the first and second supply terminals 31, 32. The supply connector 30 is configured for receiving at least two wire ends L, N. In an alternative embodiment, the supply connector may comprise at least two supply connection pins configured for cooperating with a socket plug connected to at least two power supply wire ends. The connection module 1 comprises a load connector 40 provided with at least two load connection pins for cooperating with a socket plug (not shown). In an alternative embodiment, the load connector may be configured for receiving at least two load wire ends. The at least two load connection pins comprise the first and second load terminals 41, 42. The connection module 1 may further comprise a low voltage connector 80 provided with at least two low voltage connection pins. In an alternative embodiment, the low voltage connector may be configured for receiving at least two low voltage wire ends.

Alternatively, the connection module 1 may further comprise a socket connector 90 provided with at least two socket connection pins. In an alternative embodiment, the socket connector may be configured for receiving at least two socket wire ends. In contrast with the embodiments of FIGS. 1B-2C, in the embodiments of FIGS. 3A and 3B the at least two low voltage connection pins of the low voltage connector 80, or the at least two socket connection pins of the socket connector 90, may comprise the first control terminal 51 or the second control terminal 52.

Figure 6A:
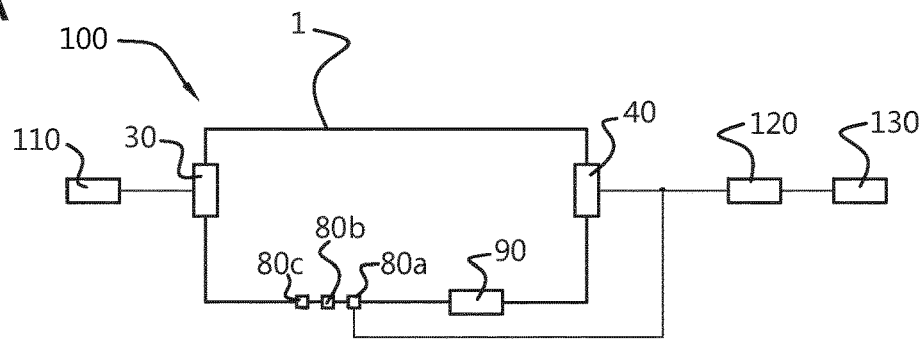
FIG. 6A-6D schematically illustrate four exemplary embodiments of a luminaire comprising a connection module.
Figure 6B:
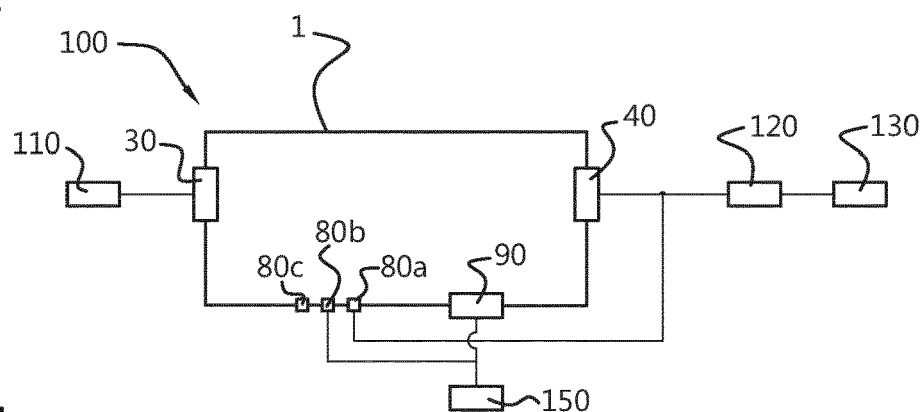
Figure 6C:
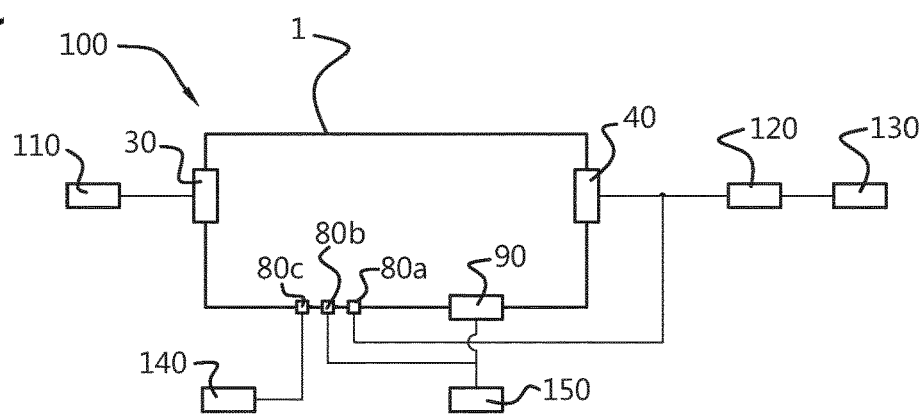
Figure 6D:
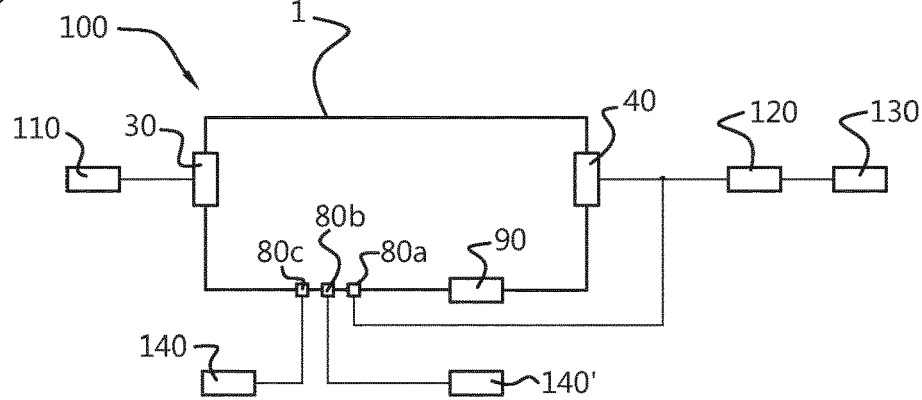

The at least low voltage connector 80 enables establishing a connection of the connection module 1 to a low voltage control means (not shown, see FIGS. 6C and 6D). Similarly, the socket connector 90 enables establishing a connection of the connection module 1 to a socket means (not shown, see FIGS. 6B and 6C). The connection module 1 may then communicate with the low voltage control means and/or with the socket means using one or more wired communication protocols such as Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), an analogue communication protocol such as an analog 4-20 mA current loop protocol used for electronic signaling. The at least one low voltage connector 80 and/or the socket connector 90 may then be used to receive and/or send at least one input and/or output signal from and/or to the low voltage control means and/or the socket means using said one or more wired communication protocols. In other embodiments, it may also be possible to use wireless communication protocols to communicate between the connection module 1 and the low voltage control means and/or the socket means, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN), but this is generally not preferred. In such embodiments, the low voltage connector 80 and/or the socket connector 90 may be omitted. It is noted that the low voltage control means and/or the socket means may in turn communicate with a remote device, such as a smartphone, a tablet, or a laptop, using wireless communication protocols. The remote device may also be a remote server.

As illustrated in FIG. 3A, the supply connector 30 further comprises the first control terminal 51. The at least two low voltage connection pins of the low voltage connector 80, or the at least two socket connection pins of the socket connector 90, comprise the second control terminal 52. A connection line 11 for electrically connecting the first and second control terminals 51, 52 is arranged on the support 10.

As illustrated in FIG. 3B, the load connector 40 further comprises the second control terminal 52. The at least two low voltage connection pins of the low voltage connector 80, or the at least two socket connection pins of the socket connector 90, comprise the first control terminal 51. A connection line 11 for electrically connecting the first and second control terminals 51, 52 is arranged on the support 10.

Figure 4A:
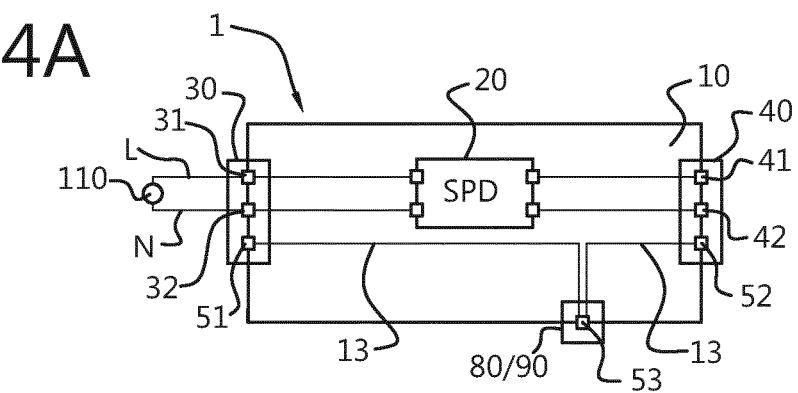
FIGS. 4A-4C schematically illustrate three other exemplary embodiments of a connection module.
Figure 4B:
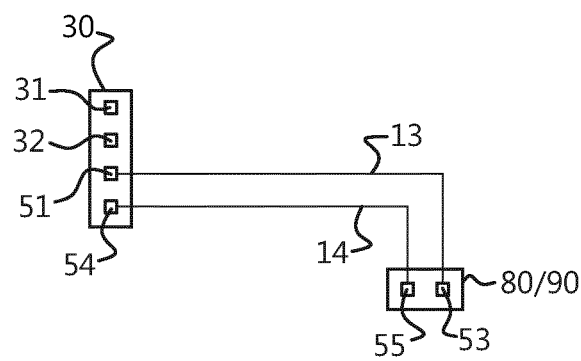
Figure 4C:
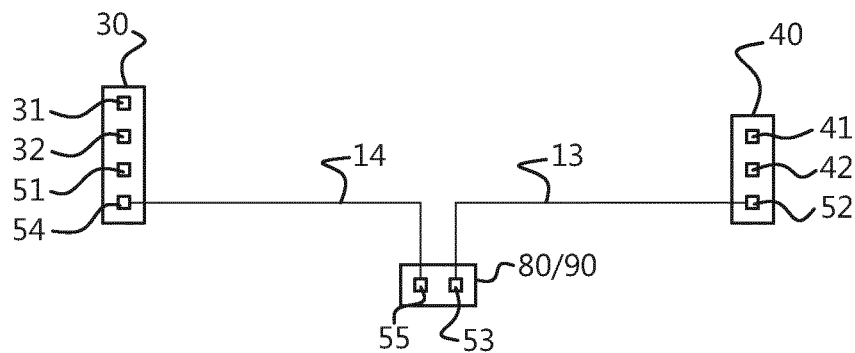

FIGS. 4A-4C schematically illustrate three other exemplary embodiments of a connection module.

As illustrated in FIGS. 4A-4C, the connection module 1 may further comprise a low voltage connector 80 provided with at least two low voltage connection pins. Alternatively, the connection module 1 may further comprise a socket connector 90 provided with at least two socket connection pins. In contrast with the embodiments of FIGS. 3A and 3B, in the embodiments of FIGS. 4A-4C the at least two low voltage connection pins of the low voltage connector 80, or the at least two socket connection pins of the socket connector 90, may comprise a third control terminal 53, the supply connector 30 comprising the first control terminal 51 and the load connector 40 comprising the second control terminal 52 as in the embodiments of FIGS. 1B-2C. In the embodiments of FIGS. 4A-4C, a connection line 13 for electrically connecting the first control terminal 51 and/or the second control terminal 52 with the third control terminal 53 is arranged on the support 10.

As illustrated in FIG. 4A, a first connection line 13 for electrically connecting the first control terminal 51 comprised in the supply connector 30 with the third control terminal 53 comprised in the low voltage connector 80 or in the socket connector 90 is arranged on the support 10. Additionally, a second connection line 13 for electrically connecting the second control terminal 52 of the load connector 30 with the third control terminal 53 comprised in the low voltage connector 80 or in the socket connector 90 is arranged on the support 10. Hence, two connections lines 13 may then start from the third control terminal 53.

As illustrated in FIG. 4B, a connection line 13 for electrically connecting the first control terminal 51 comprised in the supply connector 30 with the third control terminal 53 comprised in the low voltage connector 80 or in the socket connector 90 is arranged on the support 10. Additionally, the supply connector 30 may further comprise a fourth control terminal 54. The at least two low voltage connection pins of the low voltage connector 80, or the at least two socket connection pins of the socket connector 90, may further comprise a fifth control terminal 55. A connection line 14 for electrically connecting the fourth control terminal 54 with the fifth control terminal 55 may be arranged on the support 10.

As illustrated in FIG. 4C, a connection line 13 for electrically connecting the second control terminal 52 comprised in the load connector 40 with the third control terminal 53 comprised in the low voltage connector 80 or in the socket connector 90 is arranged on the support 10. Additionally, the supply connector 30 may further comprise a fourth control terminal 54. The at least two low voltage connection pins of the low voltage connector 80, or the at least two socket connection pins of the socket connector 90, may further comprise a fifth control terminal 55. A connection line 14 for electrically connecting the fourth control terminal 54 with the fifth control terminal 55 may be arranged on the support 10. It is noted that although the first control terminal 51 is not used in the illustration of FIG. 4C, said first control terminal 51 may be connected to a further control terminal. The further control terminal may be comprised in the load connector 40, in the low voltage connector 80 or in the socket connector 90.

Figure 5A:
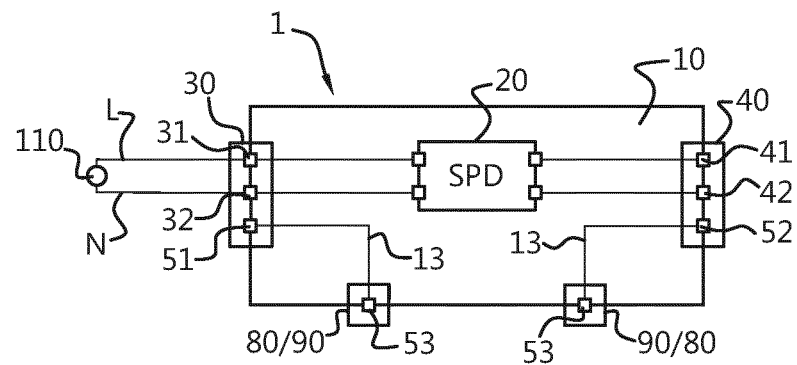
FIGS. 5A and 5B schematically illustrate two other exemplary embodiments of a connection module.
Figure 5B:
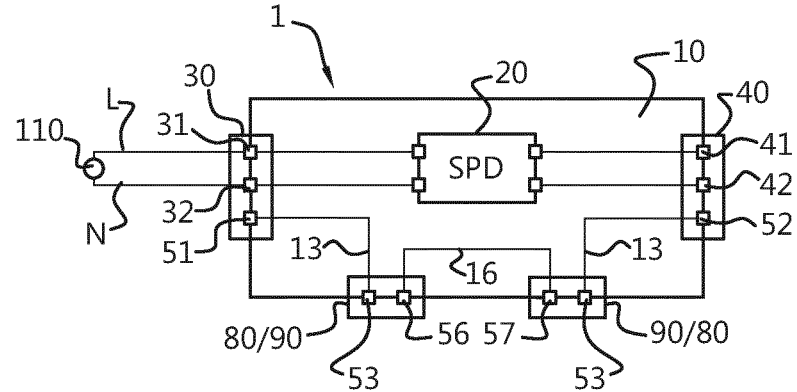

FIGS. 5A and 5B schematically illustrate two other exemplary embodiments of a connection module.

As illustrated in FIGS. 5A and 5B, the connection module 1 may further comprise a low voltage connector 80 provided with at least two low voltage connection pins. Additionally, the connection module 1 may further comprise a socket connector 90 provided with at least two socket connection pins. In contrast with the embodiments of FIGS. 4A-4C, in the embodiments of FIGS. 5A and 5B the at least two low voltage connection pins of the low voltage connector 80 and the at least two socket connection pins of the socket connector 90 may comprise a third control terminal 53. As in the embodiments of FIGS. 1B-2C and FIGS. 4A-4C, the supply connector 30 comprises the first control terminal 51 and the load connector 40 comprises the second control terminal 52. In the embodiments of FIGS. 5A and 5B, a connection line 13 for electrically connecting the first control terminal 51 with the third control terminal 53 of the low voltage connector 80 or the socket connector 90 is arranged on the support 10. Additionally, a connection line 13 for electrically connecting the second control terminal 52 with the third control terminal 53 of the low voltage connector 80 or the socket connector 90 is arranged on the support 10. As in the embodiments of FIGS. 4A-4C, in the embodiments of FIGS. 5A and 5B the supply connector 30 may further comprise a fourth control terminal (not shown). The at least two low voltage connection pins of the low voltage connector 80, and/or the at least two socket connection pins of the socket connector 90, may further comprise a fifth control terminal (not shown). A connection line (not shown) for electrically connecting the fourth control terminal 54 with the fifth control terminal 55 may be arranged on the support 10.

As illustrated in FIG. 5B, the at least two low voltage connection pins or the at least two socket connection pins may further comprise a sixth control terminal 56. In the present case, the at least two low voltage connection pins further comprise the sixth control terminal 56. The at least two low voltage connection pins or the at least two socket connection pins may further comprise a seventh control terminal 57, respectively. In the present case, the at least two socket connection pins further comprise the seventh control terminal 57. A connection line 16 for electrically connecting the sixth control terminal 56 with the seventh control terminal 57 may be arranged on the support 10.

Although not shown for clarity reasons, it should be clear for the skilled person that in the embodiments of FIGS. 3A-5B the connection module 1 may further comprise an equipotential terminal for connection to an equipotential part of a luminaire, that the supply connector 30 may further comprise the equipotential terminal, that the at least two load connection pins may further comprise a further equipotential terminal, and that a connection line for electrically connecting the equipotential terminal with the further equipotential terminal is arranged on the support 10. It should be also clear for the skilled person that in the embodiments of FIGS. 3A-5B the connection module 1 may further comprise ESD protection circuitry arranged on the support 10 and connected between the equipotential terminal and the second supply terminal 32, and that the connection module 1 may further comprise a fuse arranged on the support 10 and connected between the first supply terminal 31 and the surge protection circuitry 20.

FIG. 6A-6D schematically illustrate four exemplary embodiments of a luminaire comprising a connection module.

As illustrated in FIGS. 6A-6D, the luminaire 100 comprises a connection module 1 according to any one of the embodiments described in FIGS. 1A-5B, a power supply 110 electrically connected to the first and second supply terminals (not shown, comprised in the supply connector 30) of the connection module 1, a drive means 120 electrically connected to the first and second load terminals (not shown, comprised in the load connector 40) of the connection module 1, and a light module 130 electrically connected to the drive means 120. The connection module 1 further comprises three low voltage connectors 80*a*, 80*b*, 80*c*, each provided with at least two low voltage connection pins, and a socket connector 90 provided with at least two socket connection pins. The low voltage connector 80*a* of the connection module 1 is electrically connected to drive means 120. As illustrated in FIGS. 6B and 6C, the luminaire 100 further comprises a socket means 150 electrically connected to the socket connector 90 and to the low voltage connector 80*b* of the connection module 1. The socket means 150 is preferably configured for receiving an external module, such as a luminaire control module. An external module typically comprises at least three standard prongs or plug contacts which are inserted into corresponding apertures in the socket means. By "external module", it is meant a module external to the connection module 1. Said external module may be located in the luminaire, e.g. in the luminaire head, or may be located outside the luminaire, e.g. on an outer surface of the luminaire head.

It is noted that the socket means 150 may be in accordance with the NEMA standard (the ANSI C136.10-2017 standard or of the ANSI C136.41-2013 standard), or with the Zhaga standard (see LEX-R in book 18, Edition 1.0, July 2018). A front side of the socket means 150 may be configured for receiving electrical contacts of an external module (not shown). The external module may be configured to cooperate with such socket means 150. A rear side of the socket means 150 is intended for being electrically connected to the connection module 1 via the socket connector 90 and/or the low voltage connector 80*b*. The socket means 150 may house a plurality of contacts in apertures arranged in the front side. Each contact may be provided, at a front end, with a front contact portion configured for being electrically connected with a contact of the external module, e.g. a prong, and, at a rear end, with the socket connector 90 and/or the low voltage connector 80*b*. The front contact portions of the plurality of contacts extend near the front side.

Preferably, the socket means 150 and the external module fulfil the requirements of the ANSI C136.10-2017 standard or of the ANSI C136.41-2013 standard (i.e., NEMA socket means 150) or of the Zhaga Interface Specification Standard (i.e., Zhaga socket means 150). Note that, since it is a low voltage socket, the Zhaga socket means 150 is only connected to the low voltage connector 80*b* of the connection module 1. Also note that a NEMA socket means 150 may be connected to both the socket connector 90 and to the low voltage connector 80*b* of the connection module 1, or may be connected to only the socket connector 90, e.g. in the case the NEMA socket means 150 is provided with basic functionality, such as a functionality to switch on/off the light source of the luminaire, e.g. based on the ambient luminosity measured by a photosensor, without a dimming function.

As illustrated in FIGS. 6C and 6D, the luminaire 100 further comprises a low voltage control means 140 electrically connected to the low voltage connector 80*c* of the connection module 1. The low voltage control means 140 may be e.g. a sensor of different types: a camera such a video surveillance camera, a traffic control camera, a photo sensor, an ambient luminosity sensor, an infrared sensor, an air quality sensor, a sound sensor, and the like. In FIG. 6D, a socket means 150 is no longer electrically connected to the socket connector 90 and to the low voltage connector 80*b* of the connection module 1, and a further low voltage control means 140' is electrically connected to the low voltage connector 80*b* of the connection module 1. Note that, although not illustrated in FIG. 6D, a socket means may be electrically connected to the socket connector 90 only, e.g. in the case the NEMA socket means 150 is provided with basic functionality, such as a functionality to switch on/off the light source of the luminaire, e.g. based on the ambient luminosity measured by a photosensor, without a dimming functionality. Hence, in this particular case, the simultaneous presence of such a socket means and of two low voltage control means 140, 140' is enabled in the embodiment of FIG. 6D.

The luminaire 100 of FIGS. 6A-6D may further comprise an equipotential part (not shown) connected to the equipotential terminal 61 of the connection module 1 illustrated in FIGS. 2A-2C. The luminaire 100 may further comprise a luminaire housing (not shown) which is at least partially made of an electrically conductive material. The equipotential part of the luminaire 100 may be connected to or in contact with the electrically conductive material of the luminaire housing. The luminaire 100 may further comprise a heat sink (not shown). The equipotential part of the luminaire 100 may be connected to or in contact with the heat sink.

Figure 7:
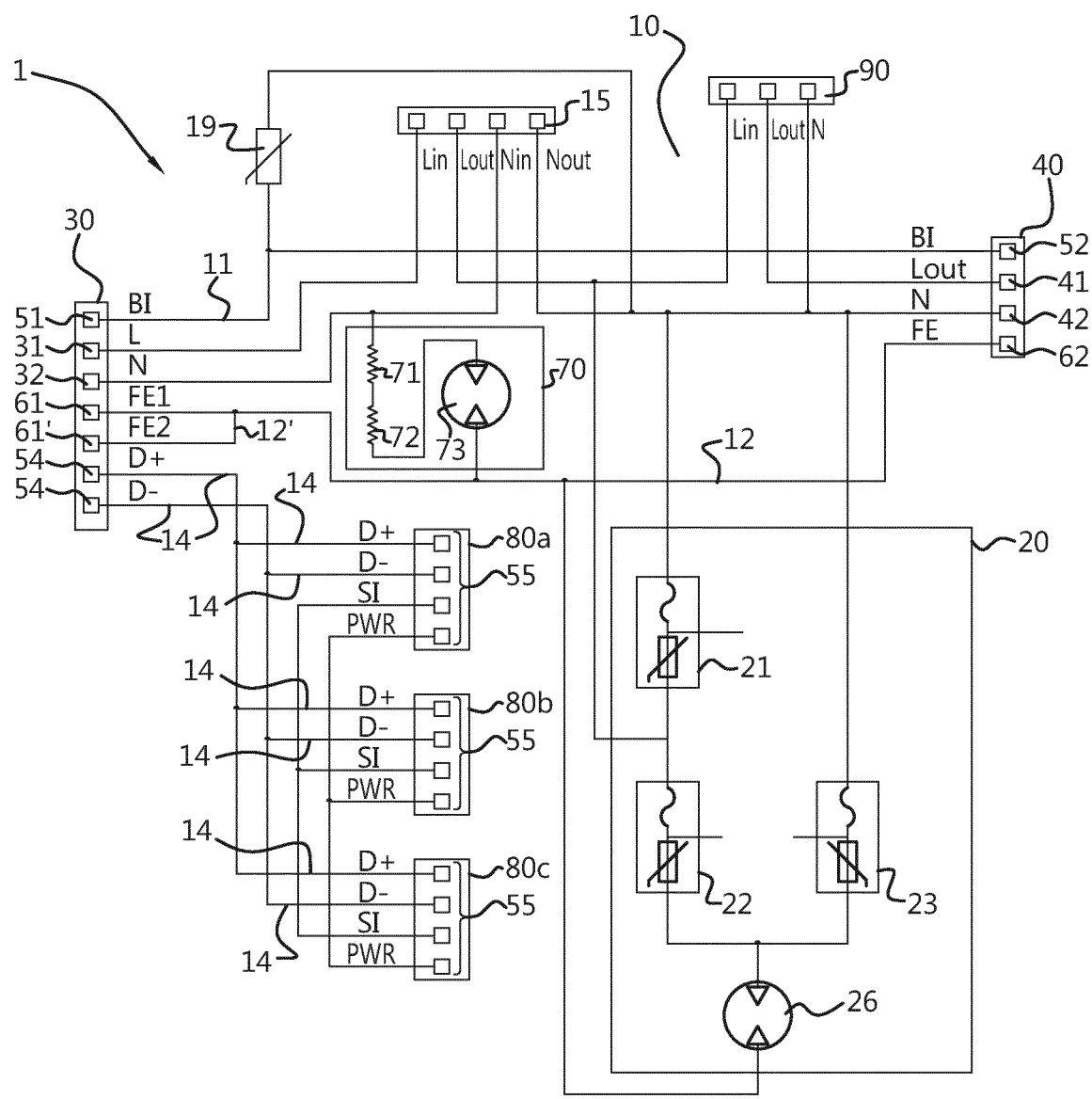
FIG. 7 schematically illustrates a detailed exemplary embodiment of a connection module.

FIG. 7 schematically illustrates a detailed exemplary embodiment of a connection module.

As illustrated in FIG. 7, the connection module 1 comprises a support 10, surge protection circuitry 20 arranged on the support 10, a first and second supply terminal 31, 32 for connection to a power supply (not shown), a first and second load terminal 41, 42 for connection to a drive means (not shown), and at least a first and second control terminal 51, 52. The first and second supply terminals 31, 32 are connected to the surge protection circuitry 20. The first and second load terminals 41, 42 are connected to the surge protection circuitry 20. A connection line 11 for electrically connecting the first and second control terminals 51, 52 is arranged on the support 10. The support 10 comprises a printed circuit board (PCB), preferably a multilayer PCB.

As illustrated in FIG. 7, the connection module 1 comprises a supply connector 30 comprising the first and second supply terminals 31, 32. The supply connector 30 is configured for receiving at least two wire ends (not shown, see FIGS. 3A-5B). The supply connector 30 further comprises the first control terminal 51. The connection module 1 comprises a load connector 40 provided with at least two load connection pins for cooperating with a socket plug (not shown). The at least two load connection pins comprise the first and second load terminals 41, 42. The at least two load connection pins further comprise the second control terminal 52. Control of the drive means may be realized by e.g. bipower (BI) control. This may be realized by the provision of a varistor 19 arranged between the first control terminal 51 and the second supply terminal 32.

As illustrated in FIG. 7, the connection module 1 comprises an equipotential terminal 61 for connection to an equipotential part of the luminaire (not shown). The supply connector 30 further comprises the equipotential terminal 61. The at least two load connection pins further comprise a further equipotential terminal 62. A connection line 12 for electrically connecting the equipotential terminal 61 with the further equipotential terminal 62 is arranged on the support 10. The supply connector 30 comprises a second equipotential terminal 61', and a second connection line 12' for electrically connecting the second equipotential terminal 61' with the connection line 62 is arranged on the support 10. The surge protection circuitry 20 is connected to the connection line 12 via a connection line arranged on the support 10. The surge protection circuitry 20 comprises three MOVs 21, 22, 23 arranged between the first supply terminal 31 and the second supply terminal 32. In a first branch, the MOV 21 is connected between the first supply terminal 31 and the second supply terminal 32. In a second branch in parallel with the first branch, the MOVs 22, 23 are connected in series between the first supply terminal 31 and the second supply terminal 32. In this embodiment, the three MOVs 21, 22, 23 are provided with integrated thermal fuses, thereby forming single elements. The surge protection circuitry 20 comprises a GDT 26 connected between the second branch comprising the MOVs 22, 23 and the connection line 12.

The connection module 1 further comprises ESD protection circuitry 70 arranged on the support 10 and connected between the equipotential terminal 61 and the second supply terminal 32. The resistive circuitry may have an equivalent resistance value which is between 1 Mega Ohm and 100 Mega Ohm, preferably between 1.5 Mega Ohm and 10 Mega Ohm, within a frequency range of 0 Hz to 100 kHz, preferably 0 Hz to 1 GHz. The resistive circuitry comprises two resistors 71, 72 connected in series in a branch between the equipotential terminal 61 and the second supply terminal 32. The connection module 1 further comprises a fuse 15 arranged on the support 10 and connected between the first supply terminal 31 and the surge protection circuitry 20. The ESD protection circuitry 70 also comprises a GDT 73 connected between the equipotential terminal 61 and the second supply terminal 32.

Although not shown, the connection module 1 may further comprise EMC filtering and in-rush current limiter arranged between the surge protection circuitry 20 and the load connector 40.

As illustrated in FIG. 7, the connection module 1 further comprises three low voltage connectors 80a, 80b, 80c, each provided with at least two low voltage connection pins. Additionally, the connection module 1 further comprises a socket connector 90 provided with at least two socket connection pins. The supply connector 30 further comprises two fourth control terminals 54: a D+ dimming control terminal and a D− dimming control terminal. The at least two low voltage connection pins of each of the three low voltage connectors 80a, 80b, 80c further comprise two fifth control terminals 55: a D+ dimming control terminal and a D− dimming control terminal. Connection lines 14 for electrically connecting the D+/D− dimming control terminal 54 with the D+/D− dimming control terminal 55 of each of the three low voltage connectors 80a, 80b, 80c are arranged on the support 10, respectively. The at least two low voltage connection pins of each of the three low voltage connectors 80a, 80b, 80c further comprise two further control terminals: a spare (SI) control terminal and a low voltage power (PWR) control terminal, typically less than 30V. A connection line for electrically connecting the three SI/PWR control terminals are arranged on the support 10, respectively.

Figure 8:
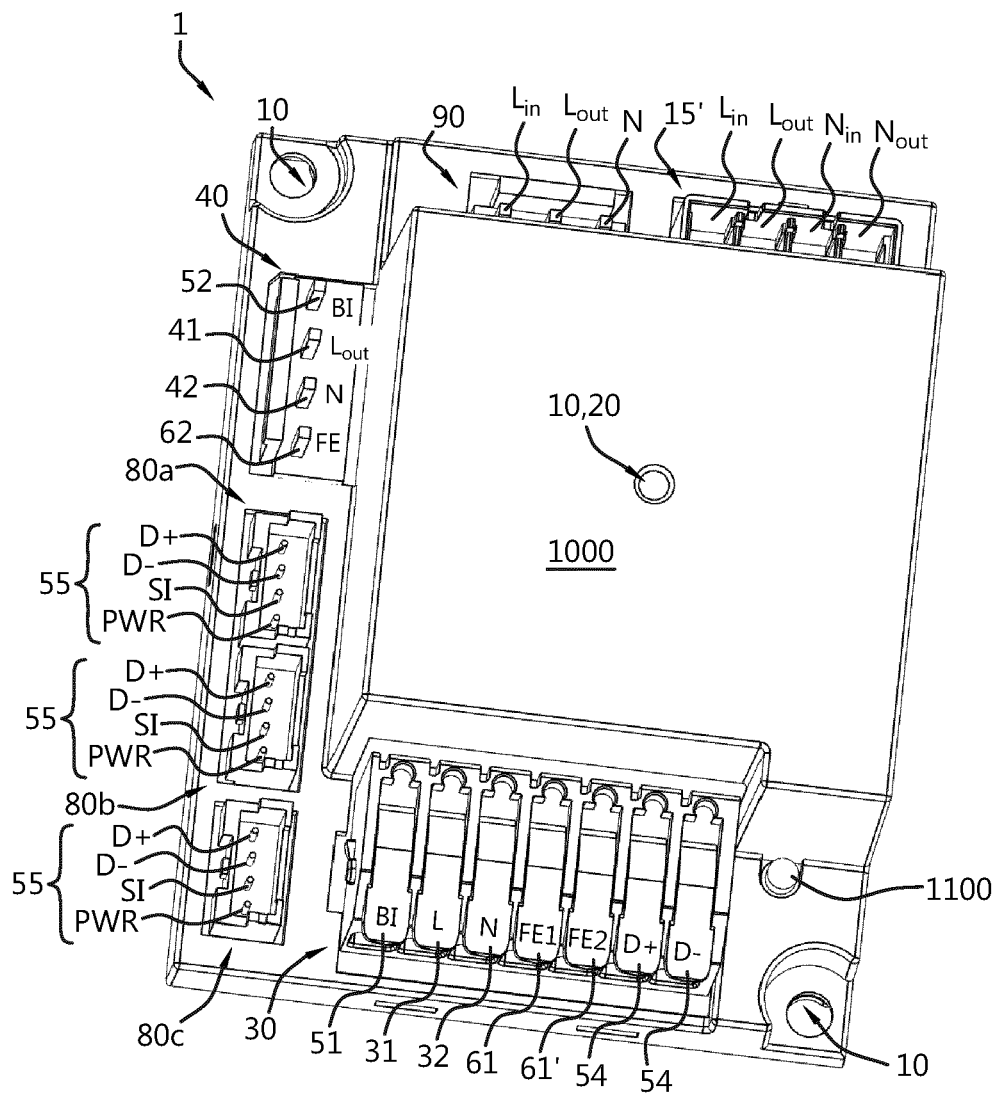
FIG. 8 illustrates a three-dimensional view of the detailed exemplary embodiment of FIG. 7.

FIG. 8 illustrates a three-dimensional view of the detailed exemplary embodiment of FIG. 7.

The connection module 1 comprises a housing 1000, a support 10 (only partly visible in FIG. 8; mainly covered by the housing 1000), surge protection circuitry arranged on the support 10 (not visible in FIG. 8; covered by the housing 1000), a first and second supply terminal 31, 32 for connection to a power supply (not shown), a first and second load terminal 41, 42 for connection to a drive means (not shown), and at least a first and second control terminal 51, 52. The support 10 comprises a printed circuit board (PCB), preferably a multilayer PCB.

The connection module 1 comprises a supply connector 30 comprising the first and second supply terminals 31, 32. The supply connector 30 is configured for receiving at least two wire ends (not shown). The supply connector 30 further comprises the first control terminal 51. The connection module 1 further comprises a load connector 40 provided with at least two load connection pins for cooperating with a socket plug (not shown). The at least two load connection pins comprise the first and second load terminals 41, 42. The at least two load connection pins further comprise the second control terminal 52. The connection module 1 further comprises a fuse connector 15' for receiving a fuse, such as the fuse 15 described in connection with FIG. 7. The connection module 1 further comprises an equipotential terminal 61 for connection to an equipotential part of the luminaire (not shown). The supply connector 30 further comprises the equipotential terminal 61. The at least two load connection pins further comprise a further equipotential terminal 62. The supply connector 30 comprises a second equipotential terminal 61'.

The connection module 1 further comprises three low voltage connectors 80a, 80b, 80c, each provided with at least two low voltage connection pins. Additionally, the connection module 1 further comprises a socket connector 90 provided with at least two socket connection pins. The supply connector 30 further comprises two fourth control terminals 54: a D+ dimming control terminal and a D− dimming control terminal. The at least two low voltage connection pins of each of the three low voltage connectors 80a, 80b, 80c further comprise two fifth control terminals 55: a D+ dimming control terminal and a D− dimming control terminal. The at least two low voltage connection pins of each of the three low voltage connectors 80a, 80b, 80c further comprise two further control terminals: a spare (SI) control terminal and a low voltage power (PWR) control terminal, typically less than 30V.

The housing 1000 comprises an upper housing part that is visible in FIG. 8 and a lower housing part that is not visible in FIG. 8 because it is located underneath the support 10. The upper and lower housing parts enable to enclose and protect the support 10, the surge protection circuitry, and the different connection lines of the connection module 1 described in FIG. 7. Besides, the upper housing part is provided with holes for receiving and surrounding the different connectors of the connection module 1 described in FIGS. 7 and 8. Hence, any user or operator of the luminaire containing the connection module 1 has an easy access to the different connectors of the connection module 1. Moreover, the upper and lower housing parts may be fitted in a detachable way in order to enable the opening of the housing 1000 and to perform maintenance of the components of the connection module 1. In an alternative embodiment, the upper and lower housing parts may be fitted in a permanent way by using e.g. snap-fit hooks or the like.

The support 10 may be provided with holes, preferably in at least two corners thereof, in order to fix the connection module 1 to the luminaire by means of screws. Accordingly, the housing 1000 may be provided with corresponding holes at the same locations as the holes of the support 10. Note that the connection module 1 may be fixed in the housing of the luminaire head or in any other location of the luminaire. Also note that, in other embodiments, only one hole may be provided to the support 10, preferably at a center thereof, that only one corresponding hole may be provided to the housing 1000 at the same location as the hole of the support 10, and that the shape of the housing 1000 may be modified accordingly. Alternatively, the support 10 can be fixed to the luminaire via any other fixing means well known by the skilled person, such as clamps, clips, snap fits elements, or the like.

In the embodiments of FIGS. 6A-6D, the luminaire 100 comprises a drive means 120 electrically connected to the load connector 40 of the connection module 1. In alternative embodiments, the drive means 120 may be provided on the support 10 of the connection module 1. In this case, the load connector 80 may be electrically connected to the drive means via connection lines provided on the support 10, and may be electrically connected to the light module 130 of FIGS. 6A-6D. In order to be able to receive the drive means 120 inside the connection module 1, the surface of the support 10 and the volume of the housing 1000 should be adapted accordingly. When the drive means 120 is included in the housing 1000, the task of connecting the connection module 1 to the luminaire is made easier for the user or the operator, with reduced risk of mistake in the cabling. When the drive means 120 is not included in the housing 1000, as described in FIGS. 6A-6D, more flexibility is offered with respect to the size of the drive means, in terms of available space inside the luminaire, and it is made possible to include other elements if needed.

The connection module 1 may further comprise an indicator device and monitoring circuitry configured to monitor a malfunctioning of the surge protection circuitry and to provide an output signal based on said monitoring. Preferably, the indicator device is arranged on or in the luminaire housing. For example, the indicator device may be arranged on the support 10 or on the housing 1000 of the connection module. Preferably, the monitoring circuitry is arranged on the support 10 of the connection module. The monitoring circuitry may be connected to the surge protection circuitry and to the indicator device such that a state of the indicator device is changed when the output signal indicates the malfunctioning of the surge protection circuitry. Hence, an operator can easily detect said malfunctioning and repair or replace the surge protection circuitry. Further, the indicator device may be arranged at a location which is such that the state of the indicator device is visible from outside of the luminaire Hence, an operator can easily detect a malfunctioning without having to open the luminaire housing. For example, in case of a typical outdoor luminaire, the malfunctioning may be visible for an operator from a location at ground level. Exemplary embodiments of a connection module comprising an indicator device and monitoring circuitry are disclosed in patent application PCT/EP2020/050419 in the name of the applicant which is included herein by reference.

For example, the indicator device indicating a malfunctioning of the surge protection circuitry may be a light emitting device 1100 such as a LED. In the embodiment of FIG. 8, the LED 1100 may be a LED emitting e.g. red light when detecting a problem with the functioning of the surge protection circuitry. The red light may be visible to any user or operator that opens the luminaire head housing in which the connection module 1 is located, or any other location where the connection module 1 is arranged. In this way, the user or operator may be warned of the malfunctioning problem, and may repair or replace the surge protection circuitry. Alternatively, the red light emitted by the LED may be visible from outside the luminaire head housing, or from outside any location where the connection module 1 is arranged. This can be achieved by using e.g. a light guide or the like that, coupled to the LED 1100, enables to redirect the red light emitted by the LED towards the outside of the luminaire. In this way, the user or operator may directly be warned of the malfunctioning of the surge protection circuitry without having to open the luminaire head housing or any other location inside the luminaire. For example, the red light emitted by the LED may be redirected towards the floor next to the location of the luminaire, or at least in a downward direction. For example, a red pattern may be visible on the floor, indicating that the surge protection circuitry is malfunctioning and therefore needs a repair or a replacement. In other embodiments, the light emitted by the LED 1100 may be e.g. green when the monitoring circuitry detects no malfunctioning of the surge protection circuitry, and may become e.g. red when the monitoring circuitry detects a malfunctioning of the surge protection circuitry.

Alternatively or in addition to the monitoring circuitry and the indicator device such as the LED 1100, a determining means, such as a monitoring or metering means, may be present in or on the luminaire housing, preferably in the connection module 1, more preferably on the support 10. Said monitoring or metering means may be able to communicate with the surge protection circuitry or to directly measure relevant information with respect to the surge protection circuitry, and to redirect and send said relevant information to a device that is remote from the connection module 1. The determining means may be linked to a remote server to provide any useful information such as malfunction, energy consumption, working time, etc., of any device connected to the connection module 1.

For example, in case of failure of the surge protection circuitry, the determining means may perform diagnostics or analysis on the surge protection circuitry, and may be able to detect said failure and to communicate it to said remote device in order to warn an operator that replacement or maintenance needs to be performed on the surge protection circuitry. Said remote device may be located inside the luminaire and may correspond to a central communication means of the luminaire with the outside, or may be located outside the luminaire, possibly in a remote place, and may be e.g. a remote server, a smartphone, tablet, or laptop of a user or an operator. In this latter case, the determining means and the remote device may form together a tele management system for indicating a failure of the surge protection circuitry. Such a tele management system may be also used e.g. to predict a maintenance or replacement of the surge protection circuitry based on a measure of its power consumption and based on its lifetime.

In an embodiment, the surge protection circuitry may provide a dimming control signal to the drive means as illustrated in FIGS. 6A-6D upon failure of the surge protection circuitry. For example, impedance networks may be coupled between respective first, second, and third input lines for the power supply means 110 as illustrated in FIGS. 6A-6D. The impedance networks may include thermal fuses such as the fuse 15 illustrated in FIG. 2C and metal oxide varistors such as the MOVs 21, 22, 23 illustrated in FIG. 2C, with a dimming control circuit having a resistive network coupled between each respective series circuit of fuses and MOVs. The resistive network may generate a 0-10 V analog dimming signal to a LED device controller. A lighting device such as the luminaire 100 of FIGS. 6A-6D operates in full lighting mode while the surge protection circuitry is in normal, high impedance mode, but operates in a dimming mode when one or more of the impedance network devices fail and cause the 0-10V signal to drop below 10 Volts. Hence, detection of the dimmed but operable luminaire 100 may serve as warning to an operator that the associated surge protection circuitry should be replaced or repaired.

The housing 1100 may comprise on its upper housing part an element enabling any user of operator to identify relevant information related to the components of the connection module 1. For example, a QR code, a scan bar, or the like may be arranged on the upper housing part, and the user or operator may scan said element using a portable electronic device in order to receive information such as the location of the factory of the connection module 1, the type and amount of the different components inside the housing 1100, and their requirements in terms of power supply, power consumption, etc. This information is especially important for a user or operator if the upper and lower housing parts are fitted in a permanent way.

Whilst the principles of the invention have been set out above in connection with specific embodiments, it is to be understood that this description is merely made by way of example and not as a limitation of the scope of protection which is determined by the appended claims.

The invention claimed is:

1. A connection module for a luminaire with a light module, comprising:
a support;
a surge protection circuitry arranged on the support;
a first and second supply terminal for connection to a power supply, said first and second supply terminal being connected to the surge protection circuitry;
a first and second load terminal for connection to a drive means of the light module, said first and second load terminal being connected to the surge protection circuitry; and
at least a first and second control terminal,
wherein the support comprises a printed circuit board, PCB,
wherein a connection line for electrically connecting the first and second control terminals is arranged on the PCB, and
wherein the first and second supply terminals, the first and second load terminals, and the first and second control terminals are arranged on the PCB.

2. The connection module according to claim 1, wherein the surge protection circuitry comprises at least one metal oxide varistor, MOV, and at least one thermal protection device.

3. The connection module according to claim 1, further comprising a supply connector comprising the first and second supply terminal, said supply connector being configured for receiving at least two wire ends.

4. The connection module according to claim 3, further comprising:
a load connector provided with at least two load connection pins for cooperating with a socket plug, said at least two load connection pins comprising the first and second load terminal; and
at least one low voltage connector provided with at least two low voltage connection pins,
wherein the supply connector further comprises the first control terminal,
wherein said at least two load connection pins further comprise the second terminal,
wherein said at least two low voltage connection pins comprise a third control terminal, and
wherein a connection line for electrically connecting at least one of the first control terminal and the second control terminal with the third control terminal is arranged on the support.

5. The connection module according to claim 3, further comprising:
a load connector provided with at least two load connection pins for cooperating with a socket plug, said at least two load connection pins comprising the first and second load terminal; and
a socket connector provided with at least two socket connection pins,
wherein the supply connector further comprises the first control terminal,
wherein said at least two load connection pins further comprise the second terminal,
wherein said at least two socket connection pins comprise a third control terminal, and
wherein a connection line for electrically connecting at least one of the first control terminal and the second control terminal with the third control terminal is arranged on the support.

6. The connection module according to claim 1, further comprising a load connector provided with at least two load connection pins for cooperating with a socket plug, said at least two load connection pins comprising the first and second load terminal.

7. The connection module according to claim 1, further comprising at least one low voltage connector provided with at least two low voltage connection pins.

8. The connection module according to claim 1, further comprising a socket connector provided with at least two socket connection pins.

9. The connection module according to claim 1, further comprising an indicator device and monitoring circuitry configured to monitor a malfunctioning of the surge protection circuitry and to provide an output signal to the indicator device based on said monitoring.

10. The luminaire comprising:
the connection module according to claim 1;
the power supply electrically connected to the first and second supply terminal of the connection module;
the drive means electrically connected to the first and second load terminal of the connection module; and
the light module electrically connected to the drive means.

11. The luminaire according to claim 10, comprising the connection module comprising:
the support;
the surge protection circuitry arranged on the support;
the first and second supply terminal for connection to the power supply, said first and second supply terminal being connected to the surge protection circuitry;
the first and second load terminal for connection to the drive means of the light module, said first and second load terminal being connected to the surge protection circuitry;
the at least first and second control terminal; and
at least one low voltage connector provided with at least two low voltage connection pins,
wherein the connection line for electrically connecting the first and second control terminals is arranged on the support, and wherein the luminaire further comprises a low voltage control means electrically connected to at least one low voltage connector of the connection module.

12. The luminaire according to claim 10, comprising the connection module comprising:
the support;
the surge protection circuitry arranged on the support;
the first and second supply terminal for connection to the power supply, said first and second supply terminal being connected to the surge protection circuitry;
the first and second load terminal for connection to the drive means of the light module, said first and second load terminal being connected to the surge protection circuitry;
the at least first and second control terminal; and
a socket connector provided with at least two socket connection pins,
wherein the connection line for electrically connecting the first and second control terminals is arranged on the support, and
wherein the luminaire further comprises a socket electrically connected to the socket connector of the connection module.

13. The luminaire according to claim 10, comprising the connection module comprising:
the support;
the surge protection circuitry arranged on the support;
the first and second supply terminal for connection to the power supply, said first and second supply terminal being connected to the surge protection circuitry;
the first and second load terminal for connection to the drive means of the light module, said first and second load terminal being connected to the surge protection circuitry;
the at least first and second control terminal; and
an equipotential terminal,
wherein a connection line for electrically connecting the first and second control terminals is arranged on the support, and
wherein the luminaire further comprises an equipotential part connected to the equipotential terminal of the connection module.

14. The luminaire according to claim 10, comprising the connection module comprising:
the support;
the surge protection circuitry arranged on the support;
the first and second supply terminal for connection to the power supply, said first and second supply terminal being connected to the surge protection circuitry;
the first and second load terminal for connection to the drive means of the light module, said first and second load terminal being connected to the surge protection circuitry;
the at least first and second control terminal; and
an indicator device and monitoring circuitry configured to monitor a malfunctioning of the surge protection circuitry and to provide an output signal to the indicator device based on said monitoring,
wherein the connection line for electrically connecting the first and second control terminals is arranged on the support, and
wherein the indicator device is arranged at a location which is such that the state of the indicator device is visible from outside of the luminaire.

15. A connection module for a luminaire with a light module, comprising:
a support;
a surge protection circuitry arranged on the support;
a first and second supply terminal for connection to a power supply, said first and second supply terminal being connected to the surge protection circuitry;
a first and second load terminal for connection to a drive means of the light module, said first and second load terminal being connected to the surge protection circuitry; and
at least a first and second control terminal,
wherein a connection line for electrically connecting the first and second control terminals is arranged on the support,
further comprising at least one of an equipotential terminal for connection to an equipotential part of the luminaire, an electrostatic discharge, ESD, protection circuitry arranged on the support and connected between the equipotential terminal and the second supply terminal, and a fuse arranged on the support and connected between the first supply terminal and the surge protection circuitry.

16. The connection module according to claim 15, wherein the ESD protection circuitry comprises resistive circuitry.

17. The connection module according to claim 16, wherein the resistive circuitry comprises at least one resistor.

18. A connection module for a luminaire with a light module, comprising:
a support;
a surge protection circuitry arranged on the support;
a first and second supply terminal for connection to a power supply, said first and second supply terminal being connected to the surge protection circuitry;
a first and second load terminal for connection to a drive means of the light module, said first and second load terminal being connected to the surge protection circuitry;
at least a first and second control terminal; and
an indicator device and monitoring circuitry configured to monitor a malfunctioning of the surge protection circuitry and to provide an output signal to the indicator device based on said monitoring,
wherein the indicator device is arranged at a location which is such that the state of the indicator device is visible from outside of the luminaire,
wherein the support comprises a printed circuit board, PCB, and
wherein a connection line for electrically connecting the first and second control terminals is arranged on the PCB.

* * * * *